Oct. 4, 1927.   1,643,967
H. F. TATE
LOW PRESSURE OIL BURNER
Filed April 12, 1923
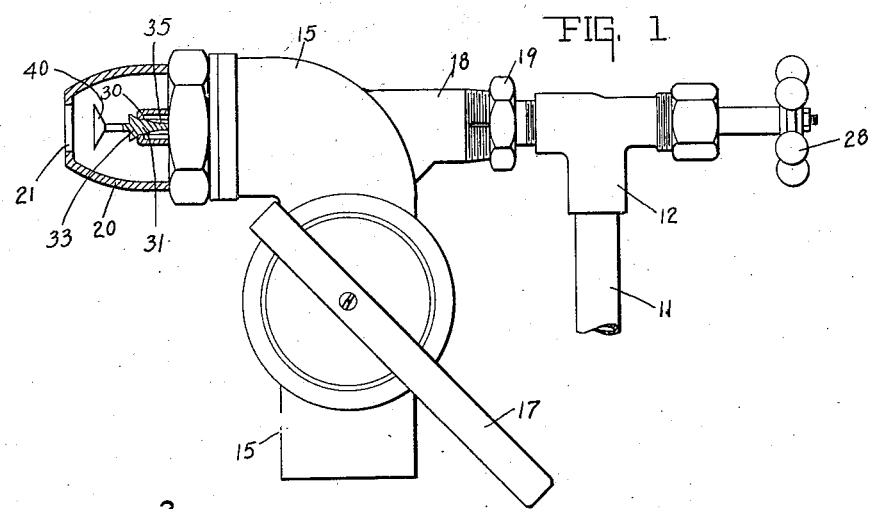
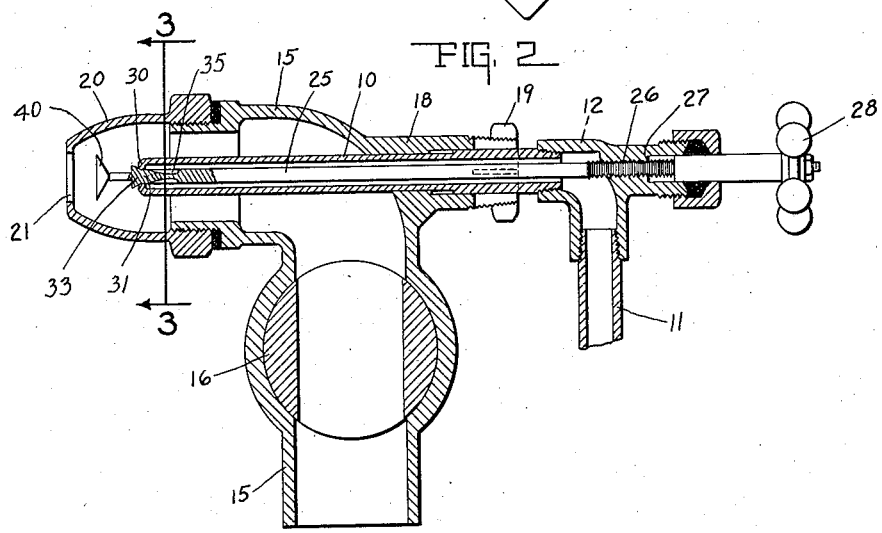
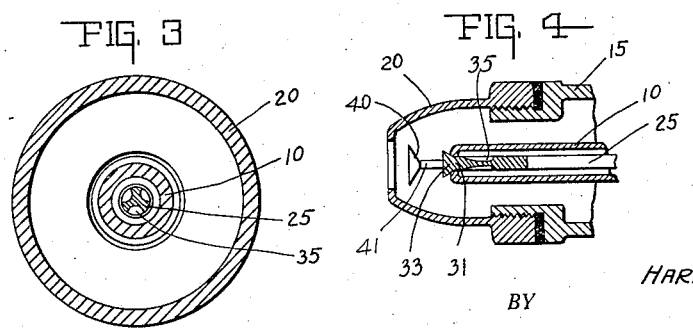
INVENTOR.
HARRY F. TATE.
BY
Lockwood & Lockwood
ATTORNEYS.

Patented Oct. 4, 1927.

1,643,967

UNITED STATES PATENT OFFICE.

HARRY F. TATE, OF KOKOMO, INDIANA, ASSIGNOR TO STA-KLEEN BURNER COMPANY, OF KOKOMO, INDIANA, A CORPORATION.

LOW-PRESSURE OIL BURNER.

Application filed April 12, 1923. Serial No. 631,581.

The object of this invention is to provide an improved construction of oil burner of the general type of that shown in the patent to William Scrimgeour, No. 936,743, patented October 12, 1909.

One feature of this invention consists in providing the valve means with a deflector at the outlet end for spreading the spray of liquid fuel or oil into and across the surrounding column of air under pressure, for affecting the desired mixture, the construction being such that the colum of air sweeps all of the film of oil off and away from the periphery or rim of the deflector so that none of the oil would fail to get into the column of air by going over upon the outer surface of the deflector and leaving it in a solid column. One characteristic of the operation of the ball valve burner is that there is a considerable film of oil that does not spray off laterally into the column of air but follows the spherical surface of the ball around to the front end and then goes off in a vortex or stream of oil not mixed with air. This stream of oil would come off from the center of the ball, and since it is not properly mixed with the air before leaving the burner, it would be wasted. In some qualities of oil and certain pressures of the air through the air passage, the percentage of this oil so wasted is considerable. One object, therefore, of this invention is to overcome the foregoing difficulty.

Another feature of this invention is the provision of two successive conical deflectors for deflecting and spraying the film of oil, the outer one being of larger diameter than the inner one, so that such heavy particles of oil as do not get properly mixed with the air when the spray of oil leaves the first and smaller deflector, would be caught by the larger and second deflector and swept by the current of air off said deflector into the body of air as it issues from the air nozzle so as to become mixed with the air and not be lost or wasted.

Another feature of this invention consists in making the nozzle or outlet of the oil tube fit snugly around the valve stem so that when in that position, the oil will be shut off. This closed position of the valve stem also holds the valve deflector tightly against the nozzle of the oil tube so that this acts as an additional means for shutting off the oil and preventing its escape when desired. To make this more effective, the valve deflector is made conical, and the extreme outer edge of the nozzle of the oil tube is also slightly flaring so that they will fit tightly together. In such arrangement the oil cannot escape from the oil tube, excepting when the valve deflector is at an appreciable distance, say an eighth of an inch, from the end of the nozzle of the oil tube; and when also in this construction the valve stem extends outwardly far enough, the nozzle of the oil tube surrounds longitudinal grooves in the valve stem; and these grooves are so formed as to cause the oil to spread as it issues from the oil tube.

In a valve burner closed like that shown in the Scrimgeour patent, one of the troubles is that the space between the end of the oil tube and the ball valve, even when the valve is open, is so slight that foreign particles of hard material lodge there and clog the outlet, and at least interferes with the outlet and with the closing of the valve. This has been a serious difficulty, and one object of the present invention is to overcome it; and this object is accomplished by having the nozzle of the oil tube hug the round section of the valve stem adjacent to the valve deflector when the oil is shut off; and when the device is operating, the deflector is so far away from the end of the oil tube that all particles will be swept through the outlet along with the oil and the device will be self-cleaning and will not clog. The former device is all right when a large amount of oil is required, but when a fine adjustment is required such burner would clog; whereas that shown herein will not clog. The difficulty in the former device exists when very high oil pressure is employed, and, therefore, the outlet opening would be very slight.

When the outlet of oil from the oil tube is closed wholly by the valve or ball, the latter does not fit tightly unless the valve stem is perfectly straight. Only then will the valve or ball center. Therefore, one feature of the present invention is to provide a guide pin extending through the valve rod for always holding it centrally. If not held centrally, more oil will pass out at one side of the valve than at the other, causing an uneven flame.

The various features of the invention will be more fully understood from the accompanying drawings and the following description and claims.

In the drawings Fig. 1 is a side elevation of the device with the nozzle end in central vertical section. Fig. 2 shows the entire device in central vertical section. Fig. 3 is a section on the line 3—3 of Fig. 2. Fig. 4 is a section like the left hand end of Fig. 2, but showing the device in operative condition.

In the drawings herein the oil tube 10 is supplied with oil coming from an oil supply pipe 11, said two pipes being connected by a connection 12 which has a passageway through it communicating with both of said tubes or pipes. The oil coming through the pipe 11 is supplied under pressure by means not shown.

The oil tube 10 extends into the bent end of an air pipe 15 through which air is supplied under pressure and the air supply is controlled by the valve 16 operated by the valve handle 17. The air tube 15 is considerably larger than the oil tube and the oil tube is mounted centrally therein by means of the tubular extension 18, the end of which is threaded and split and carries the set nut 19 adapted to clamp the oil tube 10 in adjusted position. The nozzle 20 of the air tube is screwed on the tube 15 and has a central outlet opening 21 in the end thereof. This nozzle may be replaced by other nozzles having outlet openings 21 of varying diameter as desired.

The valve rod 25 extends centrally through the oil tube 10 and is of smaller diameter so that there is an oil chamber around the rod. The outer end of the rod is threaded at 26 to screw in the extension 27 of the member 12, and there is a hand wheel 28 on the outer end of the valve rod. By turning the hand wheel, the valve rod can be moved longitudinally of the oil tube 10 and the oil tube 10 can be adjusted longitudinally of the air tube after loosening the clamping nut 19.

The nozzle or outlet end 30 of the oil tube is contracted or swaged down until it snugly fits around the cylindrical section 31 of the valve rod 25, which is adjacent to a small conical valve deflector 33. The extreme end of the nozzle 30 is flared away slightly on the inside so that the valve 33 will fit snugly against it when closed; but the chief means for closing the oil tube 10 is the fit between the nozzle 30 and the portion 31 of the valve rod when in closed position, as shown in Figs. 1 and 2.

An outlet for the oil is provided in the tube 10 by a plurality of longitudinal grooves 35 in the valve rod 25 just inside of and adjacent to the rounded portion 31 of said valve rod. This rounded portion 31 may be one-eighth of an inch long or less. There may be three or more grooves 35, but they are in such position that when the valve rod 25 is moved outwardly, as shown in Fig. 4, oil will pass outward from the tube 10 through the grooves as the oil is under pressure. These grooves are formed preferably as shown, with the rear portion deeper than the forward portion, so that the forward ends of the grooves are shallower and the walls thereof tend to deflect and spray the oil issuing from the nozzle.

The oil discharged from the nozzle of the oil tube 10 as it issues from the grooves 35 will come in a plurality of streams, and most of the oil will at once engage the valve deflector 33 and be spread outwardly into the surrounding column of air that is being forced through the nozzle 20. When the device is open, as shown in Fig. 4, the end of the nozzle 30 of the oil tube 10 is so far from the valve deflector 33 that there is no chance for sediment or hard particles to collect and clog between them, and the discharge of the oil under pressure keeps the outlet clean. The valve deflector 33 is conical and the end is flat, so that there is no tendency of the oil to creep around on the outer end of the valve deflector, but it is swept off from the annular edge thereof into the column of air.

In order to more completely mix the oil and air, a second deflector 40 is added by a small connection 41 centrally to the valve deflector 33 and which forms a continuation of the valve stem. This deflector 40 is conical and has a diameter greater than the valve deflector 33 such that particles of oil, which are not vaporized as the oil comes off the valve deflector 33, will be caught by the deflector 40 and further broken up and swept by the air current off the deflector 40 into the surrounding spray and into the column of air that is passing between the deflector 40 and the outlet end of the nozzle just before issuing through the outlet opening 21. This current of air sweeps all of the oil from the periphery of the deflector 40, and the outer end of said deflector is flat, so that none of the oil received by the deflector 40 passes around to the front side and off in a single stream, as is the case when a ball deflector or valve is used.

The burner may be adjusted to meet various conditions of operation. For instance, the nozzle 20 can be changed so that the outlet opening 21 will be suitable and in such relation to the deflector 40 as to obtain the best results in view of the oil pressure, or air pressure employed at the time. Likewise, the valve rod 25 is adjustable so as to control the discharge of oil from the oil tube 10 in suitable proportion to the air passing through the nozzle 20 under the pressure employed at the time in order that the best results may be obtained.

The invention claimed is:

1. In an oil burner, the combination of an oil feeding tube having a reduced nozzle portion and a valve rod adjustably mounted therein having a valve portion which in one position snugly fits said reduced nozzle portion for preventing the flow of oil therethrough, said rod being provided with a plurality of oil grooves inwardly of said snug fitting valve portion whereby when said valve rod is adjusted outwardly oil will be permitted to flow through said grooves and out of said tube, a deflector on said rod beyond said valve portion adapted to deflect oil issuing from said tube, and an air nozzle extending around and beyond said tube and deflector whereby the oil and air will be mixed before leaving said air nozzle.

2. In an oil burner, the combination of an oil feeding tube, a valve rod adjustably mounted therein and having a cylindrical portion in one position snugly fitting the exit end of said tube to prevent the flow of oil therethrough, said valve rod having oil conducting grooves leading to said cylindrical portion whereby when said valve rod is in another position oil may flow from said tube, and a deflector carried by said valve rod outwardly beyond said cylindrical portion and spaced from said oil conducting grooves to prevent accumulation of foreign material at the base of said deflector and whereby the oil nozzle is made self-cleaning.

3. In an oil burner, the combination of an oil feeding tube, a valve rod adjustably mounted therein and having a cylindrical portion in one position snugly fitting the exit end of said tube to prevent the flow of oil therethrough, said valve rod having oil conducting grooves leading to said cylindrical portion whereby when said valve rod is in another position oil may flow from said tube, a deflector carried by said valve rod outwardly beyond said cylindrical portion and spaced from said oil conducting grooves to prevent accumulation of foreign material at the base of said deflector and whereby the oil nozzle is made self-cleaning, and an air nozzle extending around and beyond said tube and deflector whereby oil and air will be mixed before leaving said air nozzle.

4. In an oil burner, the combination of an oil feeding tube, a valve rod adjustably mounted therein and having a cylindrical portion in one position snugly fitting the exit end of said tube to prevent the flow of oil therethrough, said valve rod having oil conducting grooves leading to said cylindrical portion whereby when said valve rod is in another position oil may flow from said tube, a deflector carried by said valve rod outwardly beyond said cylindrical portion and spaced from said oil conducting grooves to prevent accumulation of foreign material at the base of said deflector and whereby the oil nozzle is made self-cleaning, an air nozzle extending around and beyond said tube and deflector whereby oil and air will be mixed before leaving said air nozzle, and a second deflector carried by said valve rod and within the confines of said air nozzle for facilitating the mixing of oil and air within said air nozzle.

5. In an oil burner, the combination of an oil feeding tube, a valve rod adjustably mounted therein having a widened portion extending beyond the exit of said tube and also having oil conducting grooves leading toward said widened portion to facilitate spreading of the oil, said widened portion being adapted selectively to seal said oil feeding tube or deflect oil issuing therefrom, and an air nozzle having a converging portion extending around and beyond said tube and widened portion for facilitating the mixing of the oil and air before the mixture leaves said nozzle, said rod having a second deflector portion beyond the first and within said air nozzle for increasing the mixing action of the oil and air within the nozzle.

6. An oil burner including an oil tube adapted to receive oil under pressure, an adjustable valve rod therein with its outer end cylindrical to fit the outlet of said oil tube and preceding said cylindrical portion having longitudinal grooves adapted to be partially uncovered when the valve rod is moved outward, there being an oil passage between said oil tube and valve rod, and an air nozzle surrounding the end of the oil tube and having its outlet extending and reduced beyond the outer end of the valve rod, whereby the oil issuing from the oil tube will be spread by the valve rod across the path of the air in the reduced end of the nozzle and thoroughly mixed with the air before it reaches the outlet thereof.

7. An oil burner including an oil tube adapted to receive oil under pressure, an adjustable valve rod therein with its outer end cylindrical to fit the outlet of said oil tube and preceding said cylindrical portion having longitudinal grooves adapted to be partially uncovered when the valve rod is moved outward, there being an oil passage between said oil tube and valve rod, an air nozzle surrounding the end of the oil tube and extending beyond the same and having its outlet reduced, and a deflector on the outer end of said valve rod and beyond the end of the oil tube and within said air nozzle for deflecting and spreading such of the fluid as is not spread by the part of the valve rod in the end of the oil tube.

8. An oil burner including an oil tube adapted to receive oil under pressure, an adjustable valve rod therein with its outer end larger than the nozzle of said tube so the tube will be closed when the valve rod is retracted and there is an oil passage between the valve rod and said tube, an air nozzle surrounding the nozzle of the oil tube and extending beyond the same and with its outlet end contracted, whereby the oil issuing from said tube will be spread in the air nozzle and before it issues therefrom, and a deflector on the outer end of said valve rod and beyond said oil tube and not adapted to engage the oil tube and located within said air nozzle for spreading such of the oil as may not have been previously spread as it issued from said oil tube.

In witness wheerof, I have hereunto affixed my signature.

HARRY F. TATE.